United States Patent Office 3,504,737
Patented Apr. 7, 1970

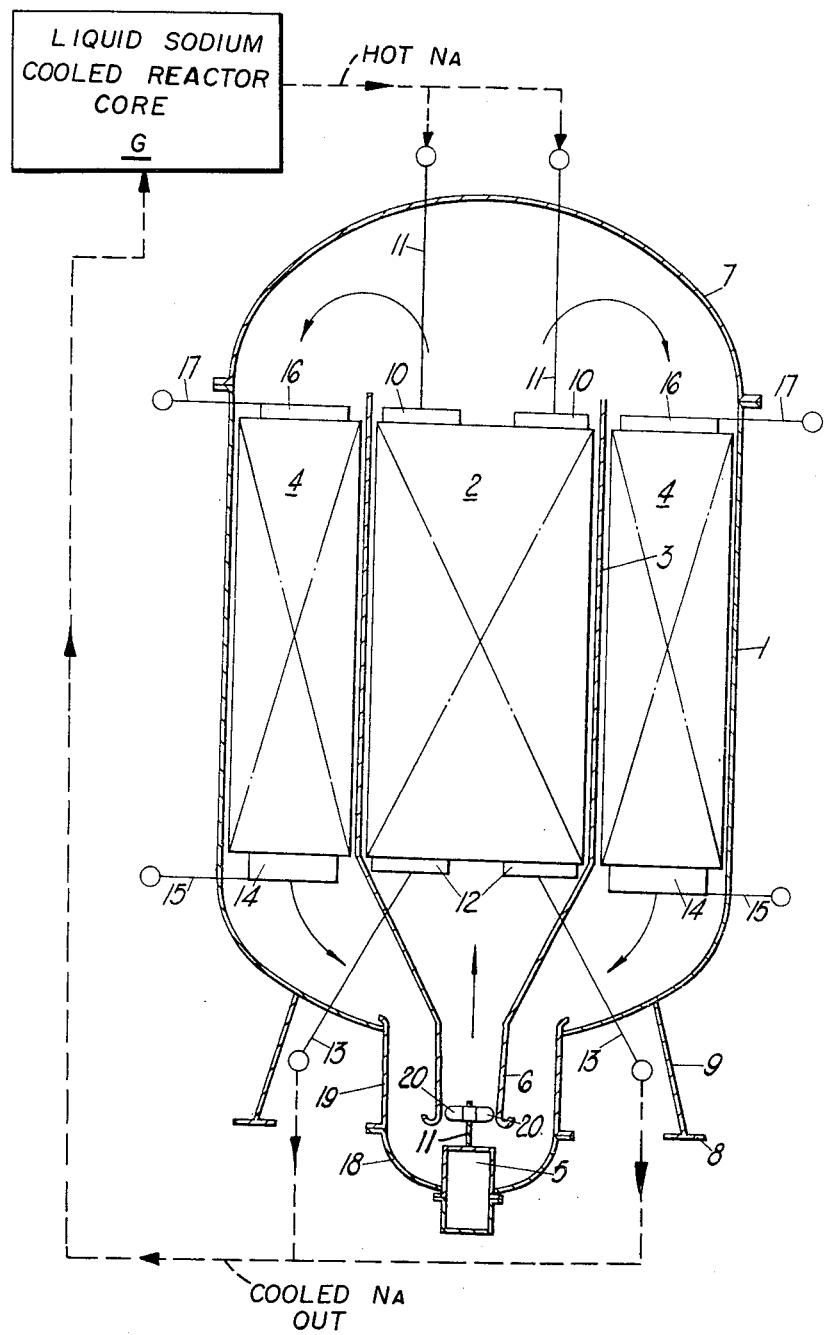

3,504,737
HEAT EXCHANGERS
Anthreas Nicholas Charcharos, 1 Craven Gardens, Harold Park, Romford, England, and Peter Anthony Taylor, 21 Southsea Ave., West Worthing, England
Filed Aug. 23, 1966, Ser. No. 574,386
Claims priority, application Great Britain, Aug. 25, 1965, 36,585/65
Int. Cl. F28d 15/00; F25f 21/00; F22b 1/02
U.S. Cl. 165—107                                 4 Claims

ABSTRACT OF THE DISCLOSURE

A heat exchanger wherein hot liquid metal is passed through a first bank of tubes within a containment vessel to heat a gas contained therein under pressure, and the heated gas is circulated in heat exchange contact with a second bank of tubes within the vessel to heat a fluid passed through such second bank of tubes.

---

This invention relates to heat exchangers and methods of heat exchanging and is concerned with such apparatus and methods that are especially useful in nuclear reactor plant.

In sodium cooled reactor plant, it has generally been considered desirable in view of the risk of leakage, that the sodium that has flowed as coolant through the core should not be used directly as the heating medium for the steam generating and heating tubes. Should water or steam leak into the sodium circuit there is the risk that the explosive reaction between the sodium and water would result in hydrogenous and solid matter passing with the sodium into the core and this could have serious results on the reactivity of the core.

To avoid the use of the sodium coolant in direct heat exchange with water or steam it has been proposed that sodium acting as an intermediate fluid should be used in a separate circuit being heated by the coolant and, in turn, heating the steam.

Two ways have been extensively considered for carrying out this proposal. In one, the intermediate sodium flows in one heat exchanger with the coolant sodium and then passes through a conduit to further heat exchanger in which it heats the steam. This tends to necessitate a duplication of pumping and insulation systems and so lead to plant that is not compact.

In the other way that has been extensively considered, the sodium flows through the inner of two concentric tubes, water surrounds the outer tube and an intermediate fluid flows in the space between the tubes. Manufacturing these concentric tubes, and connecting them into tube banks, presents considerable problems that have prevented the widespread acceptance of this proposal.

According to the present invention, there is provided a heat exchanger comprising two banks of tubes, through the first of which a heating fluid may flow and through the second of which a fluid to be heated may flow, disposed within a casing, and means for the forced circulation of an intermediate heat exchanging fluid in a closed path successively to absorb heat from elements of the first bank and give up heat to elements of the other bank.

The present invention also provides a heat exchanger comprising a containment vessel containing two banks of tubes through the first of which a heating fluid may flow and through the second of which a fluid to be heated may flow, circulating means, and baffle means defining a flow path within the containment vessel through which an intermediate fluid may be circulated by the circulating means successively from heat exchange with elements of the first bank to heat exchange with elements of the second bank.

In the accompanying drawing, which illustrates an embodiment of the present invention, there is shown a diagrammatic side view of a heat exchanger for use in a sodium cooled nuclear reactor plant.

In the accompanying drawing a pressure vessel 1 contains a first tube bank 2, a baffle 3 extending around the tube bank 2, and second tube banks 4 disposed around the baffle 2, a circulating pump 5 is disposed in an extension 6 of the pressure vessel 1.

The pressure vessel 1 has a domed lid 7 sealed to it and is provided with an annular-shaped supporting flange 8 which is joined to the pressure vessel 1 by a web 9 in the shape of a hollow frustum of a cone. The first tube bank 2 comprises a plurality of helical rows of tubes of stainless or ferritic steel which are inleaved with one another. The tubes are spaced from one another and are connected at their upper ends to inlet headers 10. Each inlet header 10 is connected to an inlet pipe 11 which extends through and is sealed to the wall of the lid 7. The lower ends of the tubes are connected to outlet headers 12. Each outlet header 12 is connected to an outlet pipe 13 which extends through and is sealed to the wall of the pressure vessel 1.

The baffle 3 provides a part of a radio-active shield between the tube bank 2 and the second tube banks 4, and is funnel shaped. The second tube banks 4 are each composed of sinuous tubes which extend horizontally back and forth between bends for the height of the tube bank. Each of the tube banks 4 is divided into three horizontally extending sections of tubes of different alloy steels with the ends of the tubes of one section butt welded to the ends of the corresponding tubes in the next section. The upper sections, which provide approximately 25% of the heights of the tube banks 4, are composed of tubes of an austenitic steel. The intermediate sections, which provide approximately 35% of the heights of the tube banks 4, are composed of tubes of a 2¼% chrome, 1% molybdenum steel. The lower section, which provide the remainder of the tube banks 4, are composed of tubes mild steel. The tube banks 4 are similar in shape to one another, each providing a section, in plan view, of an annulus lying between two radii of the annulus. When assembled with one another the tube banks 4 provide an annular-shaped mass of heat exchange tubes around the baffle 3 with the tubes spaced from one another in it. The tubes of each of the tube banks 4 are connected at their lower ends to inlet headers 44. Each inlet header 14 is connected to an inlet pipe 15 which extends through and is sealed to the wall of the pressure vessel 1. The upper ends of the tubes of each of the tube banks 4 are connected to outlet headers 16. Each outlet header 16 is connected to an outlet pipe 17 which extends through and is sealed to the wall of the pressure vessel 1.

The circulating pump 5 is sealed in a domed cap 18 which closes a cylindrical extension 19 of the pressure vessel 1. Impeller blades 20 of the circulating pump 5 are disposed in the lower end of the funnel-shaped baffle 3.

In operation the pressure vessel 1 is filled with an intermediate fluid in the form of a gas such as, for example, helium or carbon dioxide to operate at a working pressure of between 250 and 700 p.s.i. abs., preferably around 500 p.s.i. abs., and the pump 5 is started up. Hot liquid sodium coolant from a known type of nuclear power generator having a sodium cooled reactor core G is passed through the tube bank 2 as a heating fluid. For such purpose, the inlet pipe 11 is connected to the coolant outflow port of the core G to receive therefrom hot liquid sodium, and the outlet pipe 13 is connected to the coolant return port of core G to return thereto the liquid sodium received after extraction of heat therefrom. Feed water is passed as a fluid to be heated into the inlet pipes 14 and passes from the outlet pipes 17 to a known type of closed system for operating a steam turbine.

The impeller blades 20 of the pump 5 force gas up the spout end and into the interior of the funnel-shaped baffle 3. The gas passes up the interior of the baffle 3 flowing over the pipes of the first tube bank 2 and is heated by the liquid sodium flowing within these tubes. At the upper end of the baffle 3 the gas reverses its direction of flow and passes downwardly over the tubes of the tube banks 4 where heat from the gas generates superheated steam from the feed water flowing into these tubes. After passing downwardly over the tubes of the tube banks 4 and being cooled by them the gas is forced up the interior of the baffle 3 once more by the impeller blades 20.

In other embodiments of the present invention the transfer of heat from the first tube bank 2 to the second tube banks 4 is affected by circulating solid particles in suspension in the gas by means of the impeller blades 20, for example, graphite particles may be circulated in carbon dioxide.

In further embodiments of the present invention the liquid, especially an organic liquid such as a polyphenol liquid, may be used instead of a gas. A liquid metal such as liquid sodium may be used instead of the gas. However an advantage of using a gas results from the fact that the low thermal conductivity of gases entails lower thermal stresses in the tubes of the tube banks than can be expected when using a liquid metal. Furthermore a gas at a high working pressure can be pumped more efficiently by the pump 5 than a gas at low pressure. A further advantage in using a gas rather than a metal lies in the fact that gas blower technology is better established and more readily adaptable than the technology of pumping liquid metal.

In other embodiments of the present invention the baffle 3 seals the lower end of the annular space containing the second tube banks 4 from the lower end of the space containing the first tube bank 2. A system of conduits connect outlet in the wall of the vessel 1 from the lower end of the space containing the second tube banks 4 to an inlet in the wall of the vessel 1 to the lower end of the space containing the first tube bank 2 and pumping means disposed in the conduit system provides the forced circulation of the gas or liquid.

In a simple embodiment of the present invention a heat exchanger is provided wherein the tubes of a first tube bank are in coils which lie between coils of the tubes of one second tube bank in a pressure vessel and a circulating pump is provided in a conduit arranged to withdraw gas or liquid from the upper end of the pressure vessel and deliver it to the lower end of the pressure vessel.

The present invention enables heat exchangers which are compact when compared with known heat exchangers to be provided and so are relatively cheaper than them.

What is claimed is:

1. A heat exchanger system comprising a containment vessel, a first bank of tubes and a second bank of tubes both disposed within said vessel, a gas within said vessel and occupying substantially the entire free space thereof, baffle means disposed within said vessel to define a closed flow path for the circulation of said gas in heat exchange contact with said first and second banks of tubes, pumping means disposed within said vessel to circulate said gas around said flow path, first bank of tubes being disposed to accommodate the flow of a heating fluid from a source thereof outside the nuclear reactor core means disposed outside said vessel and connected to said first bank of tubes to pass therethrough core coolant as a heating fluid to heat said gas, said second bank of tubes being disposed to accommodate the flow of a fluid to be heated from a source thereof outside the vessel to heat said fluid by said heated gas.

2. A heat exchanger according to claim 1 wherein said baffle means defines within said vessel a central gas flow space containing said first bank of tubes, and a surrounding annular gas flow space containing said second bank of tubes and communicating with said central gas flow space.

3. A heat exchanger according to claim 2 wherein said pumping means is disposed at one end of said central gas flow space.

4. A heat exchanger according to claim 1 wherein said first bank of tubes confines a hot liquid metal for flow through the vessel as said heating fluid.

References Cited

UNITED STATES PATENTS

| 2,360,408 | 10/1944 | Dunn et al. | 165—140 |
| 3,231,474 | 1/1966 | Jones et al. | 165—107 |
| 3,033,538 | 5/1962 | Iddles et al. | 165—107 |
| 3,173,477 | 3/1965 | Cuzzone | 165—107 |

ROBERT A. O'LEARY, Primary Examiner

C. SUKALO, Assistant Examiner

U.S. Cl. X.R.

122—32; 165—180